(12) United States Patent
Qiu

(10) Patent No.: US 9,600,451 B2
(45) Date of Patent: Mar. 21, 2017

(54) METHOD, TERMINAL, AND SERVER FOR DISPLAYING FILE

(71) Applicant: Xiaomi Inc., Beijing (CN)

(72) Inventor: Ruiheng Qiu, Beijing (CN)

(73) Assignee: Xiaomi Inc., Beijing (CN)

( * ) Notice: Subject to any disclaimer, the term of this patent is extended or adjusted under 35 U.S.C. 154(b) by 448 days.

(21) Appl. No.: 14/140,989

(22) Filed: Dec. 26, 2013

(65) Prior Publication Data

US 2014/0215328 A1    Jul. 31, 2014

Related U.S. Application Data

(63) Continuation of application No. PCT/CN2013/084122, filed on Sep. 24, 2012.

(30) Foreign Application Priority Data

Jan. 31, 2013    (CN) .......................... 2013 1 0039296

(51) Int. Cl.
G06F 17/00    (2006.01)
G06F 17/21    (2006.01)

(52) U.S. Cl.
CPC .......... G06F 17/212 (2013.01); G06F 17/211 (2013.01)

(58) Field of Classification Search
CPC ........................... G06F 17/211; G06F 17/2264
USPC ................................. 715/200, 255, 272, 273
See application file for complete search history.

(56) References Cited

U.S. PATENT DOCUMENTS

| | | | | |
|---|---|---|---|---|
| 5,461,707 A * | 10/1995 | O'Gorman | ........... | H04N 1/3935 345/668 |
| 6,456,732 B1 * | 9/2002 | Kimbell | ............... | H04N 1/2384 358/449 |
| 8,913,087 B1 * | 12/2014 | Kejriwal | ............... | G09G 5/227 345/173 |
| 2002/0015042 A1 * | 2/2002 | Robotham | ................ | G06F 3/14 345/581 |
| 2002/0069296 A1 * | 6/2002 | Aua | .................. | G06F 17/30905 709/246 |
| 2007/0011130 A1 | 1/2007 | Yamabuchi | | |

(Continued)

FOREIGN PATENT DOCUMENTS

CN    101903861 A    12/2010
CN    102087650         6/2011

(Continued)

OTHER PUBLICATIONS

Notification on Results of Examining Patentability of Invention dated Jul. 12, 2016 in counterpart Russian Application No. 2015122102/08(034433) and English translation thereof.

(Continued)

*Primary Examiner* — Stephen Hong
*Assistant Examiner* — Gregory J Vaughn
(74) *Attorney, Agent, or Firm* — Finnegan, Henderson, Farabow, Garrett & Dunner LLP

(57) ABSTRACT

A method for a terminal to display a file includes sending to a server a file specification corresponding to the file; receiving from the server a data package for trimming page margins of the file, wherein the data package is generated according to the file specification, and includes margin trimming data of a page of the file; and displaying the page of the file based on the received data package.

20 Claims, 7 Drawing Sheets

(56) References Cited

U.S. PATENT DOCUMENTS

| | | | | |
|---|---|---|---|---|
| 2007/0058214 | A1* | 3/2007 | Honma | H04N 1/00795 358/474 |
| 2008/0052637 | A1* | 2/2008 | Ben-Yoseph | G06F 3/0481 715/800 |
| 2009/0285495 | A1* | 11/2009 | Wagner | G06K 9/00463 382/232 |
| 2010/0103436 | A1 | 4/2010 | Kim et al. | |
| 2010/0201711 | A1* | 8/2010 | Fillion | G06T 3/0012 345/660 |
| 2010/0214612 | A1 | 8/2010 | Herr | |
| 2010/0299621 | A1 | 11/2010 | Piehler et al. | |
| 2011/0016406 | A1 | 1/2011 | Grosz et al. | |
| 2011/0102467 | A1 | 5/2011 | Kudo et al. | |
| 2011/0209051 | A1 | 8/2011 | Shiimori | |
| 2012/0075673 | A1 | 3/2012 | Herr | |
| 2013/0100059 | A1* | 4/2013 | Champion | G06F 3/0488 345/173 |

FOREIGN PATENT DOCUMENTS

| | | |
|---|---|---|
| CN | 102331982 | 1/2012 |
| CN | 102541836 | 7/2012 |
| CN | 103150291 | 6/2013 |
| CN | 103620589 A | 3/2014 |
| JP | 2007/156357 A | 6/2007 |
| JP | 2007206117 A | 8/2007 |
| JP | 2008181336 A | 8/2008 |
| JP | 2011150544 A | 8/2011 |
| JP | 2012061177 A | 3/2012 |
| JP | 2012230623 A | 11/2012 |
| KR | 100745519 B1 | 8/2007 |
| WO | WO 01/52108 A2 | 7/2001 |

OTHER PUBLICATIONS

*What is PDFCrop?*, retrieved from http://pdfcrop.sourceforge.net/, dated Mar. 2, 2011. pp. 1-3.

*How to Crop Pages in a PDF Document*, retrieved from http://wikihow.com/Crop-Pages-in-a-PDF-Document, dated Aug. 5, 2012. pp. 1-3.

Extended Search Report for European Application No. EP 13873580.8 from the European Patent Office, dated Oct. 17, 2016. pp. 1-8.

\* cited by examiner

600

700

METHOD, TERMINAL, AND SERVER FOR DISPLAYING FILE

CROSS-REFERENCE TO RELATED APPLICATIONS

This application is a continuation of International Application No. PCT/CN2013/084122, filed Sep. 24, 2013, which is based upon and claims priority to Chinese Patent Application No. 201310039296.3 filed on Jan. 31, 2013, the entire contents of which are incorporated herein by reference.

TECHNICAL FIELD

The present disclosure generally relates to the technical field of computers and, more particularly, relates to a method, a terminal, and a server for displaying a file.

BACKGROUND

Conventionally, when a terminal displays a file, such as a PDF (Portable Document Format) file, on its display, an area for displaying a text portion may be small, since the PDF file has blank page margins which occupy a part of the display of the terminal. Thus, reading effect may be affected, especially when the terminal is a portable terminal with a small display, such as a smart phone, an MP3, an MP4 or an e-book reader. To enlarge the area for displaying the text portion of the PDF file, conventionally, the terminal detects the text portion on each page of the PDF file, verifies and corrects edges of the detected text portion, and cuts the blank page margins so as to display only the text portion of the page. In this way, the area for displaying the text portion is enlarged.

Since the blank page margins on respective pages of the PDF file may be different, the terminal generally needs to detect the display area on each page of the PDF file in real time according to an algorithm. In this case, a large amount of resources are consumed by the operation of trimming page margins of the PDF file. For example, because the computing resource of a mobile phone is generally limited, the process of trimming page margins of the whole PDF file runs slowly, and it generally takes several seconds to switch from displaying a current page to displaying a next page with page margin trimming, which is inefficient.

SUMMARY

According to a first aspect of the present disclosure, there is provided a method for a terminal to display a file, comprising: sending to a server a file specification corresponding to the file; receiving from the server a data package for trimming page margins of the file, wherein the data package is generated according to the file specification, and includes margin trimming data of a page of the file; and displaying the page of the file based on the received data package.

According to a second aspect of the present disclosure, there is provided a terminal for displaying a file, comprising: a processor; and a display coupled to the processor; wherein the processor is configured to: send to a server a file specification corresponding to the file; receive from the server a data package for trimming page margins of the file, wherein the data package is generated according to the file specification, and includes margin trimming data of a page of the file; and display the page of the file on the display based on the received data package.

According to a third aspect of the present disclosure, there is provided a method for a server to provide a data package for a terminal to display a file, comprising: receiving from the terminal a file specification corresponding to the file; determining whether a data package for trimming page margins corresponding to the received file specification is present in the server, the data package including margin trimming data of a page of the file; and sending, if it is determined that the data package is present in the server, the data package for the terminal to display the file.

According to a fourth aspect of the present disclosure, there is provided a server for providing a data package for a terminal to display a file, comprising: a processor; and a memory for storing instructions executable by the processor; wherein the processor is configured to: receive from the terminal a file specification corresponding to the file; determine whether a data package for trimming page margins corresponding to the received file specification is present in the server, the data package including margin trimming data of a page of the file; and send, if it is determined that the data package is present in the server, the data package for the terminal to display the file.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
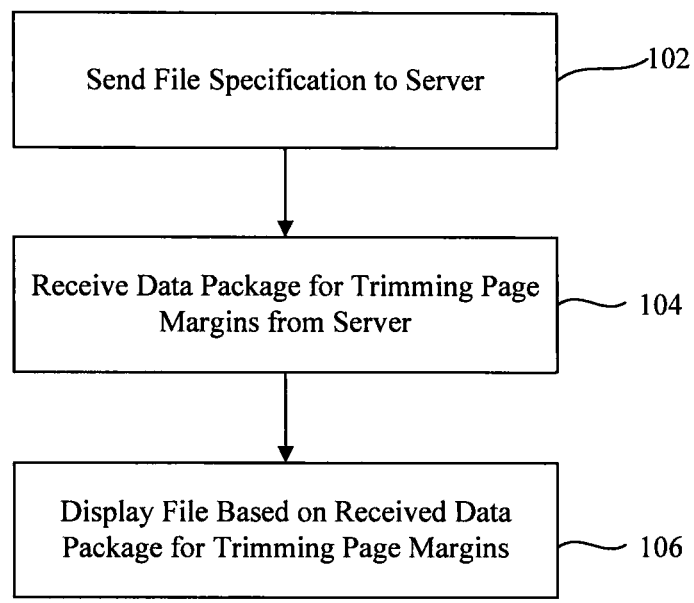
FIG. 1 is a flowchart of a method for a terminal to display a file, according to an exemplary embodiment.

FIG. 1 is a flowchart of a method 100 for a terminal to display a file, according to an exemplary embodiment. For example, the terminal may be a smart TV, a smart phone, a tablet computer or the like. Referring to FIG. 1, the method 100 includes the following steps.

In step 102, the terminal sends a file specification to a server. The file specification corresponds to a file to be displayed that includes at least one page, and is used for uniquely identifying the file.

In step 104, the terminal receives a data package for trimming page margins of the file from the server. The data package is generated by the server according to the file specification, and includes margin trimming data of at least one page of the file.

In the illustrated embodiment, after receiving the file specification corresponding to the file sent by the terminal, the server sends the data package for trimming page margins of the file to the terminal. The data package for trimming margins corresponds to the file, and can be used for trimming page margins of the file. If the file contains multiple pages, the data package includes margin trimming data of the multiple pages of the file.

In step 106, the terminal displays the file based on the received data package for trimming page margins.

In the method 100, the terminal trims page margins of the file according to the data package for trimming margins received from the server. As a result, resources that would otherwise be consumed by the operation of trimming page margins are saved, and efficiency of trimming page margins of the file is improved.

Figure 2:
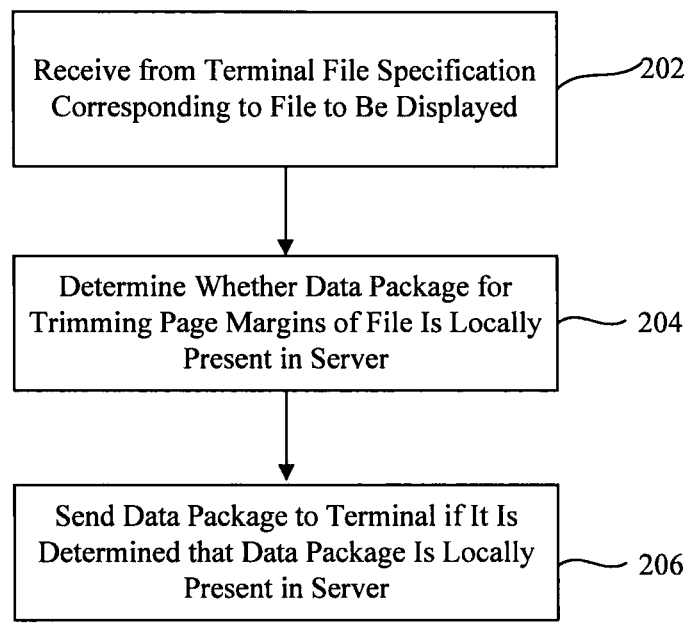
FIG. 2 is a flowchart of a method for a server to provide a data package for trimming margins of a file, according to an exemplary embodiment.

FIG. 2 is a flowchart of a method 200 for a server to provide a data package for trimming page margins for a terminal to display a file, according to an exemplary embodiment. Referring to FIG. 2, the method 200 includes the following steps.

In step 202, the server receives from a terminal, such as the terminal in the method 100 (FIG. 1), a file specification corresponding to a file to be displayed that includes at least one page. The file specification is used for uniquely identifying the file.

In step 204, the server determines whether a data package for trimming margins of the file corresponding to the received file specification is locally present in the server. If it is determined that the data package is locally present, the server performs step 206; otherwise, the method 200 ends.

In the illustrated embodiment, the server pre-stores at least one data package for trimming page margins of at least one file, and the at least one data package for trimming margins includes margin trimming data for at least one page of the at least one file. The data package for trimming margins of the file corresponding to the received file specification can be identified according to the received file specification. If the server determines that the data package for trimming margins of the file corresponding to the received file specification is locally present, the server performs step 206; Otherwise, the server responds to the terminal by indicating that there is no data package for trimming margins of the file corresponding to the received file specification, and the method 200 ends.

In step 206, the server sends the data package for trimming margins of the file corresponding to the received file specification by transmitting the data package to the terminal. such that the terminal can trim page margins of the file according to the data package for trimming margins.

Figure 3:
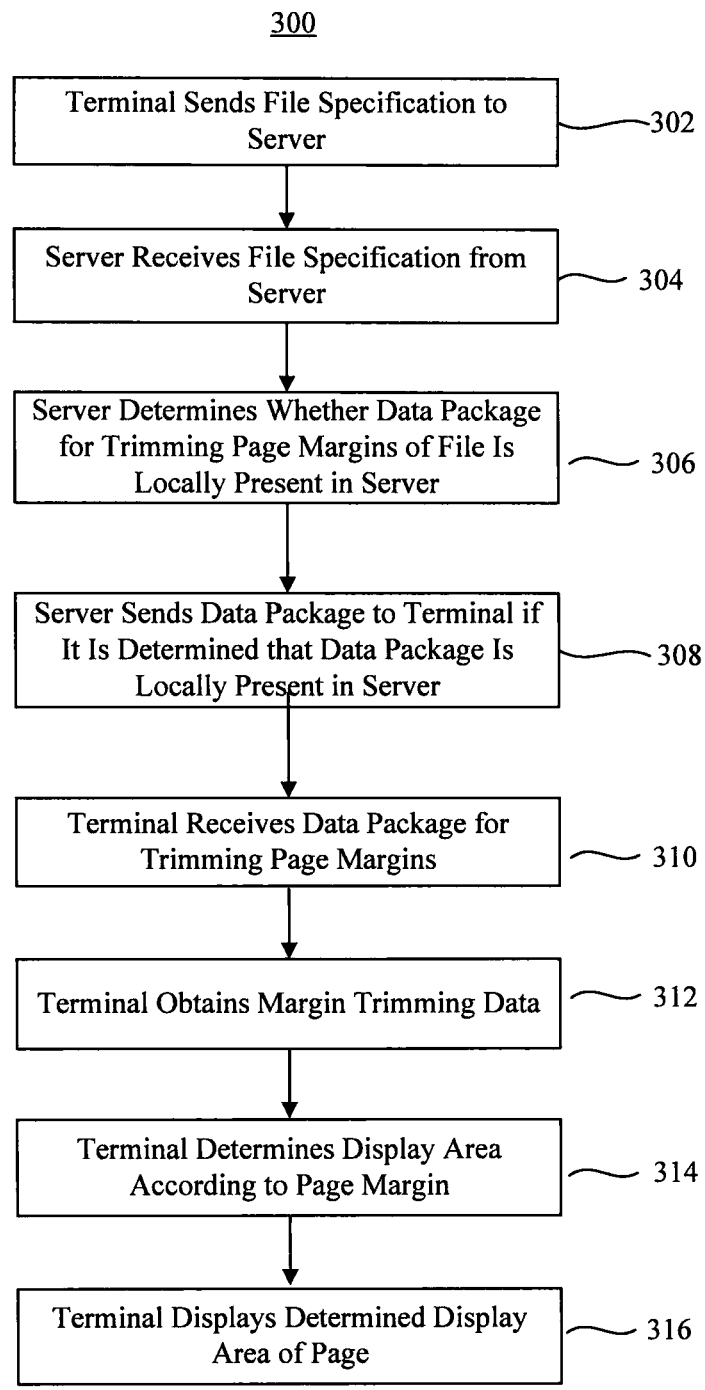
FIG. 3 is a flowchart of a method for a system to display a file, according to an exemplary embodiment.

FIG. 3 is a flowchart of a method 300 for a system to display a file, according to an exemplary embodiment. For example, the system includes a server, such as the server in the method 200 (FIG. 2), and one or more terminals, such as the terminal in the method 100 (FIG. 1). Referring to FIG. 3, the method 300 includes the following steps.

In step 302, a terminal sends a file specification to the server. The file specification corresponds to a file to be displayed, and is used for uniquely identifying the file. For example, the file specification may be a numerical value calculated according to an encryption algorithm, such as a Message-Digest Algorithm 5 (MD5). In this case, a MD5 calculation may be performed on a file name of the file, and a MD5 value obtained by the calculation is used as the file specification. Also for example, the file may be a PDF file, and may include at least one page. When the file includes multiple pages, each page of the file may be identified by its page number.

In step 304, the server receives from the terminal the file specification corresponding to the file. In the illustrated embodiment, the terminal sends the file specification to the server for requesting a data package for trimming page margins of the file.

In exemplary embodiments, before receiving the file specification from the terminal for requesting the data package, the server collects page information of the file and generates the data package for trimming page margins of the file according to the collected page information. The data package for trimming page margins may include margin trimming data of at least one page of the file, and the margin trimming data may further include a page margin that includes at least one of a left margin, a right margin, a top margin, or a bottom margin.

In one exemplary embodiment, the server collects page information of at least one page of the file from one or more terminals in the system. The page information includes the file specification corresponding to the file, a page number of the page, and used margin trimming data of the page. In the present disclosure, used margin trimming data generally refers to the margin trimming data that the one or more terminals, from which the page information is collected, have actually used in margin trimming when displaying the file. The server also determines whether the file specification in the page information is locally present in the server. If it is determined that the file specification in the page information is locally present in the server, the server adds the used margin trimming data of the page to a used margin trimming data set of the page according to the file specification and the page number, and generates margin trimming data of the page according to the used margin trimming data set of the page.

In the illustrated embodiments, because different pages of the file have different page margins, the server collects used margin trimming data of each page, and generates margin trimming data of the corresponding page according to the used margin trimming data. In one exemplary embodiment, the server collects used margin trimming data of the same page of the same file from more than one terminal in the system, combines the collected used margin trimming data into the used margin trimming data set, and generates the margin trimming data of the page according to the used margin trimming data set, thereby improving accuracy of the margin trimming data.

In the illustrated embodiments, the server includes the file specification corresponding to the file and the page number of the page as the page information, to identify the page to which the used margin trimming data corresponds. As a result, the server may determine whether the file specification is locally present in the server after obtaining the file specification in the page information. If the server determines that the file specification is locally present, the server adds the used margin trimming data of the page to the margin trimming data set of the page according to the page number in a buffer corresponding to the file specification, and generates the margin trimming data of the page according to the used margin trimming data set.

As described above, the margin trimming data includes a page margin, and the page margin includes at least one of a left margin, a right margin, a top margin, or a bottom margin. Accordingly, the server calculates an average value of the used margin trimming data corresponding to each type of page margin in the used margin trimming data set of the page, to generate the margin trimming data of the page.

In the illustrated embodiments, because the used margin trimming data for each page includes four types of page margin, i.e., the left margin, the right margin, the top margin, and the bottom margin, when generating the margin trimming data according to the used margin trimming data set, the server can separately calculate the average value of the used margin trimming data of the page corresponding to each type of the page margin, thereby improving the accuracy of the margin trimming data.

In exemplary embodiments, the server can generate the margin trimming data of the page based on a variety of methods. For example, the server can generate the margin trimming data of the page according to all data in the used margin trimming data set. Also for example, the server can generate the margin trimming data of the page by removing a largest group and a smallest group of the used margin trimming data of the page from the used margin trimming data set.

In one exemplary embodiment, the used margin trimming data set of page 3 of the file includes a first group of used margin trimming data (300, 80, 300, 80), a second group of used margin trimming data (320, 95, 315, 70), a third group of used margin trimming data is (290, 79, 295, 86), and a fourth group of used margin trimming data (290, 84, 302, 74). In each group of the used margin trimming data, the first value is the left margin, the second value is the top margin, the third value is the right margin, and the fourth value is the bottom margin. Accordingly, the server calculates the margin trimming data corresponding to the left margin based on the first values 300, 320, 290, and 290 in each group of the used margin trimming data, e.g., (300+320+290+290)/4=300. Similarly, the server calculates the margin trimming data corresponding to the top margin, the margin trimming data corresponding to the right margin, and the margin trimming data corresponding to the bottom margin to be 84.5, 303, and 77.5, respectively. Accordingly, the server generates the margin trimming data of page 3 of the file as (300, 84.5, 303, 77.5).

In one exemplary embodiment, the file is a PDF file, and a unit of the margin trimming data is a logical unit of the page defined in the PDF specification. For example, the page is defined to be 800×600. When displaying the PDF file on the terminal, a size of each logical unit can be calculated according to an actual size of a display interface of the terminal. For example, the calculated logical unit may be 1/72 inch, 1/86 inch, etc.

In exemplary embodiments, to avoid that the collected used margin trimming data is inaccurate due to user operation error, in addition to collecting the used margin trimming data, the server also collects displaying time of the page corresponding to the used margin trimming data and filters the used margin trimming data according to the displaying time. As a result, the server can remove the used margin trimming data that is inaccurate due to user operation error.

In one exemplary embodiment, when the server determines that the file specification in the page information is locally present in the server, in addition to adding the used margin trimming data of the page to the used margin trimming data set of the page, the server also adds into a displaying time set the displaying time corresponding to the used margin trimming data according to the file specification and the page number. The server further generates the margin trimming data of the page according to the used margin trimming data set and the displaying time set of the page.

In one exemplary embodiment, the server removes the used margin trimming data that is inaccurate due to user operation error based on the displaying time set. For example, the server determines that the displaying time of the page is less than a threshold value and, in response to the determination, removes the displaying time from the displaying time set. The server also removes the used margin trimming data corresponding to the removed displaying time from the used margin trimming data set.

In the exemplary embodiments, if the server determines that the displaying time of the page is less than the threshold value, it means that the reading time for reading the page is short. Thus, the used margin trimming data corresponding to the displaying time is probably inaccurate due to user operation error. If the server determines that the displaying time of the page is larger than or equal to the threshold value, it means the reading time for reading the page is long. Thus, the used margin trimming data corresponding to the displaying time should be accurate. For example, the threshold value may be manually set, such as 5 seconds. In this case, the server removes the used margin trimming data of the page from the used margin trimming data set if the corresponding displaying time is less than 5 seconds.

In exemplary embodiments, to generate the margin trimming data of the page according to the used margin trimming data set and the displaying time set of the page, the server multiplies each group of used margin trimming data with a displaying time corresponding to the group of used margin trimming data, and calculates average value of the used margin trimming data corresponding to each type of the page margin in the used margin trimming data set after the multiplying, respectively, to generate the margin trimming data of the page.

In exemplary embodiments, the server can generate the margin trimming data of the page based on a variety of methods. For example, the server can generate the margin trimming data of the page according to the used margin trimming data set after multiplying with the corresponding displaying times. Also for example, the server can generate the margin trimming data of the page after removing a largest group and a smallest group of the used margin trimming data from the used margin trimming data set after multiplying with the respective displaying times.

In one exemplary embodiment, the used margin trimming data set of page 3 in the file includes a first group of used margin trimming data (300, 80, 300, 80); a second group of used margin trimming data (320, 95, 315, 70); a third group of used margin trimming data (290, 79, 295, 86); a fourth group of used margin trimming data is (290, 84, 302, 74). Correspondingly, the displaying time set of page 3 in the file includes a first displaying time 40 seconds; a second displaying time 48 seconds; a third displaying time 32 seconds; and a fourth displaying time 40 seconds. In each group of used margin trimming data, the first value is the left margin, the second value is the top margin, the third value is the right margin, and the fourth value is the bottom margin. In this case, the server calculates the margin trimming data corresponding to the left margin according to the first value of each group of the used margin trimming data and the displaying time corresponding to the first value, e.g., (300×40+320×48+290×32+290×40)/(40+48+32+40)=311.8125. Similarly, the server calculates the margin trimming data corresponding to the top margin, the margin trimming data corresponding to the right margin, and the margin trimming data corresponding to the left margin to be 85.3, 304, and 76.7, respectively. Accordingly, the server generates the margin trimming data of the page as (311.8125, 85.3, 304, 76.7).

Still referring to FIG. 3, in step 306, the server determines whether the data package for trimming page margins of the file corresponding to the received file specification is locally present in the server. If it is determined that the data package is locally present, the server performs step 308; otherwise, the server responds to the terminal that there is no data package for trimming margins of the file corresponding to the file specification, and the method 300 ends.

In step 308, the server sends the data package for trimming page margins of the file to the terminal. Specifically, the server sends the data package determined according to the file specification to the terminal, the data package including margin trimming data of the at least one page in the file.

In step 310, the terminal receives the data package for trimming page margins of the file from the server.

In step 312, the terminal obtains the margin trimming data corresponding to a page number of a current page to be displayed from the received data package, the obtained margin trimming data including a page margin, which further includes at least one of a left margin, a top margin, a right margin, or a bottom margin.

In step 314, the terminal determines a display area of the current page according to the page margin. For example, the current page is 800×600, and the obtained margin trimming data is (300, 84.5, 303, 77.5). In this case, if a center of the current page is taken as an origin of coordinate, and a length and a width of the current page are taken as X-axis and Y-axis, respectively, the terminal determines that the display area of the current page as an area surrounded by a first line at X=−100, a second line at Y=215.5, a third line at X=97, and a fourth line at Y=−222.5.

In one exemplary embodiment, the terminal determines whether the obtained margin trimming data is modified by a user. If it is determined that the obtained margin trimming data is modified by the user, the terminal accepts the modified margin trimming data, and determines the display area based on the modified margin trimming data.

In step 316, the terminal displays the determined display area of the current page.

In exemplary embodiments, the terminal does not receive the data package for trimming margins from the server. Accordingly, the terminal sets the margin trimming data of the current page. For example, the set margin trimming data includes a page margin, and the page margin includes at least one of the left margin, the right margin, the top margin, or the bottom margin. The terminal further determines the display area of the current page according to the page margin in the set margin trimming data, and displays the determined display area.

In exemplary embodiments, if there is no used margin trimming data set corresponding to the file specification in the server, or if a number of the groups of the used margin trimming data in the used margin trimming data set is not sufficient to generate the margin trimming data of the page, the server may send to the terminal a notification message for notifying the terminal that the server does not have the data package for trimming margins of the file. After receiving the notification message, the terminal sets the margin trimming data of the current page, determines the display area of the current page according the set margin trimming data, and then displays the determined display area.

In exemplary embodiments, after displaying the determined display area of the current page, the terminal further sends to the server the margin trimming data corresponding to the current page that the terminal actually used, to allow the server to re-generate the margin trimming data of the current page. For example, the terminal sends page information which includes the file specification, the page number of the current page, and the used margin trimming data to the server.

In exemplary embodiments, to save transmission resource, if the margin trimming data for the current page is not modified, the terminal may not send the used margin trimming data to the server.

In exemplary embodiments, to avoid that the margin trimming data used by the terminal is inaccurate due to user operation error, the terminal also sends a displaying time of the page to the server.

In exemplary embodiments, the terminal sends the page information to the server at a preset time. The preset time be a time within a predetermined time period after displaying the current page, a time when the terminal connects to the server at a next time, a time when the network on which the system operates is idle, a time when the terminal accesses a Wireless Fidelity (Wi-Fi) network, a time when the terminal requests a data package for trimming margins from the server, etc.

Figure 4:
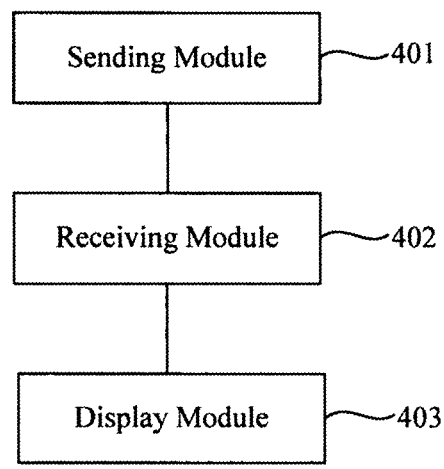
FIG. 4 illustrates a block diagram of a terminal, according to an exemplary embodiment.

FIG. 4 illustrates a block diagram of a terminal 400, according to an exemplary embodiment. For example, the terminal 400 may be a smart TV, a smart phone, a tablet computer or the like. Referring to FIG. 4, the terminal 400 includes a sending module 401 for sending a file specification corresponding to a file including at least one page; a receiving module 402 for receiving a data package for trimming page margins, the data package including margin trimming data of at least one page of the file; and a display module 403 for displaying the file based on the data package for trimming page margins.

Figure 5:
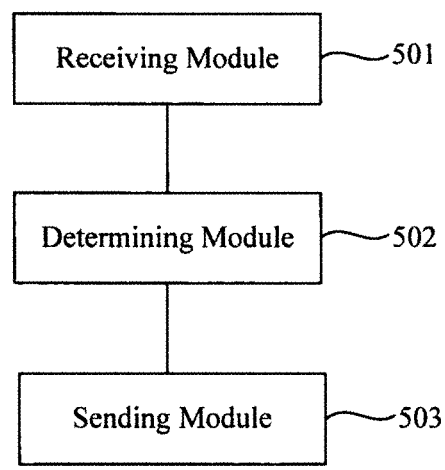
FIG. 5 illustrates a block diagram of a server, according to an exemplary embodiment.

FIG. 5 illustrates a block diagram of a server 500, according to an exemplary embodiment. Referring to FIG. 5, the server 500 includes a receiving module 501 for receiving a file specification corresponding to a file including at least one page; a determining module 502 for determining whether a data package for trimming page margins of the file corresponding to the received file specification is locally present, the data package including margin trimming data of at least one page of the file; and a sending module 503 for sending the data package for trimming page margins if the determining module 502 determines that the data package for trimming page margins of the file corresponding to the received file specification is locally present.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of sub-modules.

Figure 6:
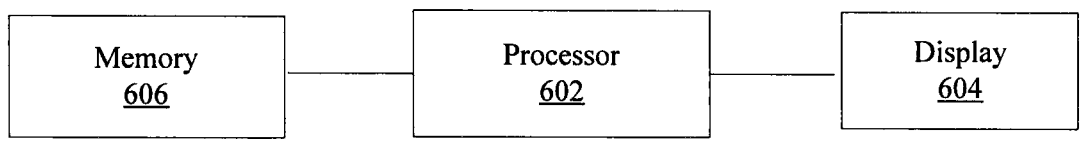
FIG. 6 illustrates a block diagram of a terminal, according to an exemplary embodiment.

FIG. 6 is a block diagram of a terminal 600 for displaying a file, according to an exemplary embodiment. Referring to FIG. 6, the terminal 600 includes a processor 602 and a display 604. The terminal 600 also includes memory resources, represented by a memory 606 for storing data as well as for storing program instructions and otherwise facilitating operation of the processor 602. In exemplary embodiments, there is also provided a non-transitory readable storage medium including instructions, such as included in the memory 606, executable by the processor 602 in the terminal 600, for performing the above-described methods.

Figure 7:
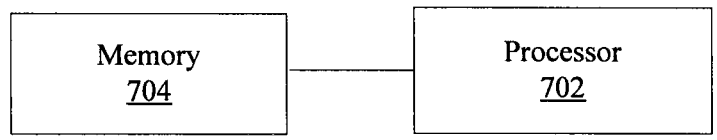
FIG. 7 illustrates a block diagram of a server, according to an exemplary embodiment.

FIG. 7 is a block diagram of a server 700, according to an exemplary embodiment. Referring to FIG. 7, the server 700 includes a processor 702 and memory resources, represented by a memory 704, for storing data as well as for storing program instructions and otherwise facilitating operation of the processor 702. In exemplary embodiments, there is also provided a non-transitory readable storage medium including instructions, such as included in the memory 704, executable by the processor 702 in the server 700, for performing the above-described methods.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a terminal to display a file, comprising:
   sending to a server a file specification corresponding to the file;
   receiving from the server a data package for trimming page margins of the file, wherein the data package is generated according to the file specification, and includes margin trimming data of a page of the file;
   obtaining the margin trimming data of the page from the received data package, the obtained margin trimming data including a page margin, and the page margin including at least one of a left margin, a right margin, a top margin, or a bottom margin; and
   displaying the page of the file based on the obtained margin trimming data.

2. The method of claim 1, further comprising:
   determining a display area of the page based on the page margin;
   wherein the displaying includes displaying the determined display area of the page.

3. The method of claim 2, further comprising:
   sending to the server page information regarding the page, the page information including the file specification corresponding to the file, a page number of the page, used margin trimming data of the page corresponding to the determined display area, and a displaying time for the page.

4. The method of claim 1, wherein the file is a first file, the method further comprising:
   sending to the server a file specification corresponding to a second file;
   receiving from the server a notification message indicating that the server does not have a data package for trimming margins of the second file;
   setting, after the receiving of the notification message, margin trimming data of a current page of the second file, the set margin trimming data including a page margin;
   determining a display area of the current page of the second file according to the page margin in the set margin trimming data; and
   displaying the determined display area.

5. A terminal for displaying a file, comprising:
   a processor; and
   a display coupled to the processor;
   wherein the processor is configured to:
   send to a server a file specification corresponding to the file;
   receive from the server a data package for trimming page margins of the file, wherein the data package is generated according to the file specification, and includes margin trimming data of a page of the file;
   obtain the margin trimming data of the page from the received data package, the obtained margin trimming data including a page margin, and the page margin including at least one of a left margin, a right margin, a top margin, or a bottom margin; and
   display the page of the file on the display based on the obtained margin trimming data.

6. The terminal of claim 5, wherein the processor is further configured to:
   determine a display area of the page based on the page margin; and
   display on the display the determined display area of the page.

7. The terminal of claim 6, wherein the processor is further configured to:
   send to the server page information regarding the page, the page information including the file specification corresponding to the file, a page number of the page, used margin trimming data of the page corresponding to the determined display area, and a displaying time for the page.

8. The terminal of claim 5, wherein the file is a first file, the processor being further configured to:
   send to the server a file specification corresponding to a second file;
   receive from the server a notification message indicating that the server does not have a data package for trimming margins of the second file;
   set, after the receiving of the notification message, margin trimming data of a current page of the second file, the set margin trimming data including a page margin;
   determine a display area of the current page of the second file according to the page margin in the set margin trimming data; and
   display the determined display area.

9. A method for a server to provide a data package for a terminal to display a file, comprising:
   receiving from the terminal a file specification corresponding to the file;
   determining whether a data package for trimming page margins corresponding to the received file specification is present in the server, the data package including margin trimming data of a page of the file, wherein the margin trimming data includes a page margin, and the page margin includes at least one of a left margin, a right margin, a top margin, or a bottom margin; and sending, if it is determined that the data package is present in the server, the data package for the terminal to display the file by obtaining the page margin from the data package.

10. The method of claim 9, before the receiving from the terminal of the file specification, further comprising:
receiving page information regarding the page of the file, the page information including the file specification corresponding to the file, a page number of the page, and used margin trimming data of the page;
determining whether the file specification in the page information is present in the server;
if it is determined that the file specification in the page information is present, adding the used margin trimming data of the page to a used margin trimming data set according to the file specification and the page number; and
generating the margin trimming data of the page according to the used margin trimming data set.

11. The method of claim 10, the generating comprising:
calculating an average value of the used margin trimming data corresponding to each type of the page margin in the used margin trimming data set, to generate the margin trimming data of the page.

12. The method of claim 9, before the receiving from the terminal of the file specification, further comprising:
receiving page information regarding the page of the file, the page information including the file specification corresponding to the file, a page number of the page, used margin trimming data of the page, and a displaying time for the page;
determining whether the file specification in the page information is present in the server;
if it is determined that the file specification in the page information is present, adding the used margin trimming data of the page to a used margin trimming data set, and adding the displaying time to a displaying time set corresponding to the used margin trimming data according to the file specification and the page number; and
generating the margin trimming data of the page according to the used margin trimming data set and the displaying time set.

13. The method of claim 12, before the generating of the margin trimming data, further comprising:
determining that the displaying time is less than a preset threshold value;
removing the displaying time from the displaying time set; and
removing the used margin trimming data corresponding to the removed displaying time from the used margin trimming data set.

14. The method of claim 12, the generating comprising:
multiplying each group of used margin trimming data with corresponding displaying times, respectively; and
calculating an average value for the used margin trimming data corresponding to each type of the page margin in the used margin trimming data set after the multiplying, to generate the margin trimming data of the page.

15. A server for providing a data package for a terminal to display a file, comprising:
a processor; and
a memory for storing instructions executable by the processor;
wherein the processor is configured to:
receive from the terminal a file specification corresponding to the file;
determine whether a data package for trimming page margins corresponding to the received file specification is present in the server, the data package including margin trimming data of a page of the file, wherein the margin trimming data includes a page margin, and the page margin includes at least one of a left margin, a right margin, a top margin, or a bottom margin; and
send, if it is determined that the data package is present in the server, the data package for the terminal to display the file by obtaining the page margin from the data package.

16. The server of claim 15, wherein the processor is further configured to:
receive page information regarding the page of the file, the page information including the file specification corresponding to the file, a page number of the page, and used margin trimming data of the page;
determine whether the file specification in the page information is present in the server;
if it is determined that the file specification in the page information is present, add the used margin trimming data of the page to a used margin trimming data set of the page according to the file specification and the page number; and
generate the margin trimming data of the page according to the used margin trimming data set.

17. The server of claim 16, the processor being further configured to:
calculate an average value of the used margin trimming data corresponding to each type of the page margin in the used margin trimming data set, to generate the margin trimming data of the page.

18. The server of claim 15, wherein the processor is further configured to:
receive page information regarding the page of the file, the page information including the file specification corresponding to the file, a page number of the page, used margin trimming data of the page, and a displaying time for the page;
determine whether the file specification in the page information is present in the server;
if it is determined that the file specification in the page information is present, add the used margin trimming data of the page to a used margin trimming data set of the page, and add the displaying time to a displaying time set of the page corresponding to the used margin trimming data according to the file specification and the page number; and
generate the margin trimming data of the page according to the used margin trimming data set and the displaying time set.

19. The server of claim 18, wherein the processor is further configured to:
determine that the displaying time is less than a preset threshold value;
remove the displaying time from the displaying time set; and
remove the used margin trimming data corresponding to the removed displaying time from the used margin trimming data set.

20. The server of claim 18, the processor being further configured to:
multiply each group of used margin trimming data with corresponding displaying times, respectively; and
calculate an average value for the used margin trimming data corresponding to each type of the page margin in the used margin trimming data set after the multiplying, to generate the margin trimming data of the page.

* * * * *